P. KELLEHER & J. C. RANDLETT.

Moccasin Shoe-Pacs.

No. 6,099. Reissued Oct. 27, 1874.

Witnesses:
Geo. T. Smallwood
W. R. Edelen.

Inventors
Patrick Kelleher,
James C. Randlett,
by
John J. Halsted, Atty.

THE GRAPHIC CO. PHOTO-LITH. 39 & 41 PARK PLACE, N.Y.

UNITED STATES PATENT OFFICE.

PATRICK KELLEHER AND JAMES C. RANDLETT, OF BANGOR, MAINE.

IMPROVEMENT IN MOCCASIN-SHOE PACKS.

Specification forming part of Letters Patent No. 122,030, dated December 19, 1871; reissue No. 6,099, dated October 27, 1874; application filed October 12, 1874.

DIVISION B.

*To all whom it may concern:*

Be it known that we, PATRICK KELLEHER and JAMES C. RANDLETT, both of Bangor, in the county of Penobscot and State of Maine, have invented certain new and useful Improvements in the Manufacture of Moccasin Shoes or Shoe-Packs; and we do hereby declare that the following is a full and exact description thereof, reference being had to the accompanying drawing and to the letters of reference marked thereon.

The nature of our invention consists in so cutting the leather or material of which the packs are manufactured as to be able to do all the sewing of the upper parts by machinery, instead of by hand, the latter being the method necessarily employed at present; and it also enables us to improve the shape and to so change the position of some of the seams as to add very much to the durability of the packs.

Figure 2:
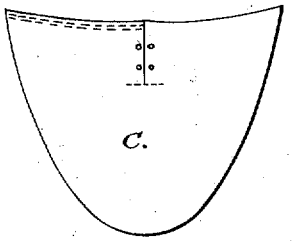
Figure 3:
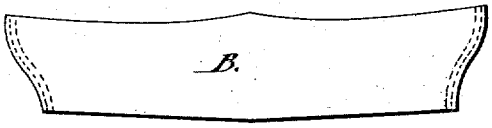
Figure 4:
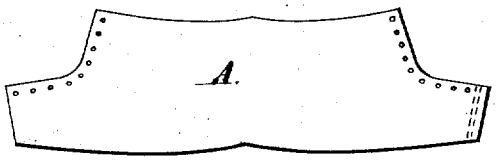
Figure 1:
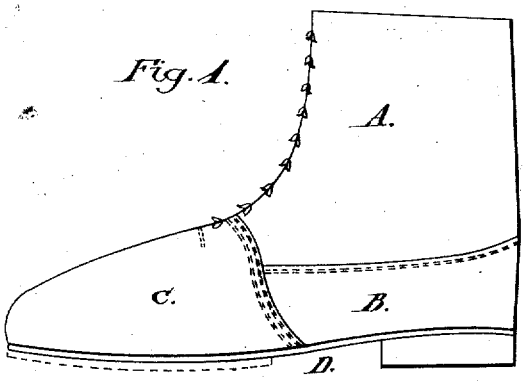
Figure 5:
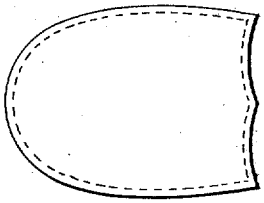
Figure 6:
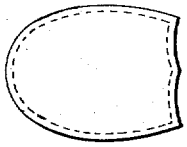
Figure 7:
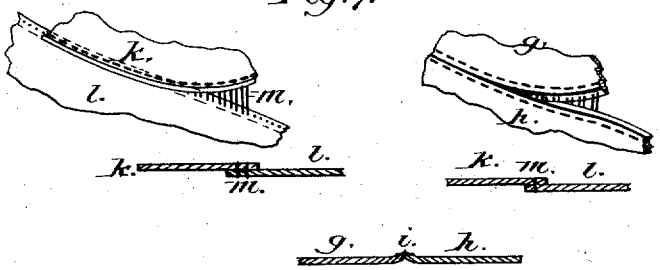

In the accompanying drawing, Figure 1 is a shoe-pack made after our improved patterns, showing where the pieces are sewed together to form the complete pack. Fig. 2 is the vamp. Fig. 3 is the quarter. Fig. 4 is the tap; Fig. 5, a tap; Fig. 6, a heel; and Fig. 7 illustrates the difference between the flat seam used in our mode of joining the parts together and the old seam heretofore used for that purpose.

The relative positions of the parts is shown in Fig. 1, in which A is the top of the shoe; B, the quarter; C, the vamp; and D, the sole. There is a free selection of stock in relation to the service each part is designed to sustain when they are put together; but the principal benefit is found in the fact that the seams can be made flat and stitched by machinery, thus avoiding all hand-work. The quarter B is formed in one piece and joins directly onto the vamp and forms a flat seam both at its junction with the top and with the vamp, allowing both of these seams to be stitched by machinery. The vamp C is also stitched to the parts A, B, and D by similar flat seams, all the seams being flat lap-seams, thus allowing them all to be closed by sewing-machines and avoiding hand-work altogether in sewing these parts of the pack, the seams having been heretofore made by butting the edges of the leather together one against the other, and then by hand-sewing partially through the edge of the leather, as shown at *g i h*, Fig. 7.

The upper parts having been all joined together, the edges are turned over a last, and the sole is fitted on and held onto the upper parts by nails or brads until it is sewed through and through, making this also a flat seam and giving a good shape to the pack. A piece of the same material, and of the same thickness as the uppers, is fitted in on the inside of the sole, between the edges of the uppers, to level up and make a smooth bearing for the bottom of the foot. The vamp is slit down a short distance for the purpose of getting the shoe on and off easily, but, when laced up, passes nearly straight across the foot. The shape of the different parts of this shoe-pack allows the manufacturer to select his stock with reference to the wear and tear of the particular part for which the stock is to be used, and thereby economize the use of the most expensive stock; and the shape of the parts and the adoption of the flat lap-seam enable all the seams to be closed by machinery.

A heel and tap may be added at pleasure, either by sewing or pegging.

The different parts of this shoe-pack are designed and arranged expressly with a view to enable all the seams to be closed by machinery, and to dispense with hand-work altogether in the sewing, even to the sewing on the soles; and for this purpose all the patterns have been simplified and the lap-seams adopted; and it is believed that there never was a pack made heretofore in which lap-seams were used exclusively, nor in which all the seams, even to sewing on the soles, could be accomplished by machinery; but by the use of these patterns and the lap-seams every seam may be closed on a machine, thereby reducing the cost of manufacturing very materially, enabling them to be made more rapidly and allowing the thick, heavy, and expensive leather to be used for soles, and the lighter and less expensive leather can be used for uppers.

What we claim as our invention, and wish to secure by Letters Patent, is—

1. A moccasin-shoe pack, formed of the parts A B C D, cut as shown and described.

2. A shoe-pack with a quarter cut in the form shown in Fig. 3, and formed in one piece, and running around the heel and forward to the vamp C, as specified.

3. The combination, in a shoe-pack, of t parts A B C D, such parts being united t gether by flat lap-seams.

PATRICK KELLEHER.

JAMES C. RANDLETT.

Witnesses:
FRED. H. COOMBS,
FRED. W. SARGENT.